(12) United States Patent
Iwasaki et al.

(10) Patent No.: US 8,970,993 B2
(45) Date of Patent: Mar. 3, 2015

(54) MAGNETORESISTIVE MAGNETIC HEAD WITH MAGNETORESISTIVE FILM INCLUDING A METAL LAYER AND A HEUSLER ALLOY LAYER, AND MAGNETIC RECORDING AND REPRODUCING APPARATUS

(71) Applicant: Kabushiki Kaisha Toshiba, Minato-ku, Tokyo (JP)

(72) Inventors: Hitoshi Iwasaki, Tokyo (JP); Shuichi Murakami, Tokyo (JP); Masayuki Takagishi, Tokyo (JP); Susumu Hashimoto, Tokyo (JP); Yousuke Isowaki, Yokohama (JP); Naoki Hase, Tokyo (JP); Masaki Kado, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/165,023

(22) Filed: Jan. 27, 2014

(65) Prior Publication Data
US 2014/0211338 A1 Jul. 31, 2014

(30) Foreign Application Priority Data
Jan. 30, 2013 (JP) .................................. 2013-016014

(51) Int. Cl.
*G11B 5/39* (2006.01)

(52) U.S. Cl.
CPC .................................. *G11B 5/3912* (2013.01)
USPC .......................................... 360/319; 360/324

(58) Field of Classification Search
USPC ............. 360/319, 324, 324.1, 324.11, 324.12, 360/324.2
See application file for complete search history.

(56) References Cited

U.S. PATENT DOCUMENTS

| 5,793,279 | A | * | 8/1998 | Nepela ......................... 338/32 R |
| 6,667,862 | B2 | | 12/2003 | Zhu |
| 6,828,897 | B1 | * | 12/2004 | Nepela ......................... 338/32 R |
| 6,876,522 | B2 | * | 4/2005 | Ambrose et al. .......... 360/324.11 |
| 7,035,062 | B1 | | 4/2006 | Mao et al. |
| 7,268,984 | B2 | * | 9/2007 | Hasegawa et al. ....... 360/324.11 |
| 7,525,772 | B2 | * | 4/2009 | Koui et al. ................. 360/324.1 |
| 7,558,028 | B2 | * | 7/2009 | Carey et al. .............. 360/324.12 |

(Continued)

FOREIGN PATENT DOCUMENTS

| JP | 2009-170556 | 7/2009 |
| JP | 2010-140586 | 6/2010 |

(Continued)

OTHER PUBLICATIONS

English computer translation of JP 2012-190914 published on 10/4/1012 (5 pages).*

(Continued)

*Primary Examiner* — Brian Miller
(74) *Attorney, Agent, or Firm* — Nixon & Vanderhye, P.C.

(57) ABSTRACT

A magnetic head according to an embodiment includes a first magnetic shield and a second magnetic shield that are opposed to each other, and a magnetoresistive film arranged between the first magnetic shield and the second magnetic shield, and including a first magnetic layer including a first metal layer that contains 90 at. % or more of Fe and a first Heusler alloy layer, a second magnetic layer arranged on a side of the first Heusler alloy layer opposite from the first magnetic layer, and an intermediate layer arranged between the first Heusler alloy layer and the second magnetic layer.

24 Claims, 7 Drawing Sheets

(56) References Cited

U.S. PATENT DOCUMENTS

| | | | |
|---|---|---|---|
| 8,189,304 B2 * | 5/2012 | Okamura et al. | 360/324.11 |
| 8,243,400 B2 | 8/2012 | Ishikawa et al. | |
| 8,582,249 B2 | 11/2013 | Sapozhnikov et al. | |
| 8,743,511 B2 * | 6/2014 | Childress et al. | 360/324.2 |
| 2001/0030841 A1 | 10/2001 | Nishiyama et al. | |
| 2009/0180215 A1 * | 7/2009 | Ishikawa et al. | 360/313 |
| 2010/0188771 A1 * | 7/2010 | Okamura et al. | 360/75 |
| 2012/0276415 A1 * | 11/2012 | Sapozhnikov et al. | 428/831 |

FOREIGN PATENT DOCUMENTS

| | | |
|---|---|---|
| JP | 2012-190914 | 10/2012 |
| JP | 2012-230750 | 11/2012 |

OTHER PUBLICATIONS

Dato et al., "Large Magnetoresistance Effect in Epitaxial $Co_2Fe_{0.4}Mn_{0.6}Si/Ag/Co_2Fe_{0.4}Mn_{0.6}Si$ Devices", Applied Physics Express 4 (2011), 3 pages.

Office Action mailed Mar. 28, 2014 in counterpart Japanese Application No. 2013-016014 and English translation thereof.

Office Action dated Nov. 14, 2014 in counterpart JP Application No. 2013-016014 and English-language translation thereof.

* cited by examiner

| Fe THICKNESS (nm) | CoFeMnSi ALLOY THICKNESS (nm) | MR RATIO | MAGNETOSTRICTION (ppm) |
|---|---|---|---|
| 1 | 3 | 16 | 9 |
| 1.5 | 2.5 | 15 | 7.8 |
| 2 | 2 | 14.3 | 5.2 |
| 2.5 | 1.5 | 8.8 | 4 |
| 3 | 1 | 3.8 | 3.2 |

A-A SECTION

MAGNETORESISTIVE MAGNETIC HEAD WITH MAGNETORESISTIVE FILM INCLUDING A METAL LAYER AND A HEUSLER ALLOY LAYER, AND MAGNETIC RECORDING AND REPRODUCING APPARATUS

CROSS REFERENCE TO RELATED APPLICATIONS

This application is based upon and claims the benefit of priority from prior Japanese Patent Application No. 2013-016014 filed on Jan. 30, 2013 in Japan, the entire contents of which are incorporated herein by reference.

FIELD

Embodiments described herein relate generally to magnetoresistive magnetic heads and magnetic recording and reproducing apparatuses.

BACKGROUND

A magnetic recording and reproducing apparatus includes a magnetoresistive magnetic head that reads data stored in a magnetic recording medium such as a hard disk drive. As the recording density of the magnetic recording medium has been improved, a reading sensor (magnetoresistive magnetic head) with high sensitivity, i.e., a great resistance change rate, and low noise characteristics is needed.

DETAILED DESCRIPTION

A magnetic head according to an embodiment includes a first magnetic shield and a second magnetic shield that are opposed to each other, and a magnetoresistive film arranged between the first magnetic shield and the second magnetic shield and including a first magnetic layer including a first metal layer that contains 90 at. % or more of Fe and a first Heusler alloy layer, a second magnetic layer arranged on a side of the first Heusler alloy layer opposite from the first magnetic layer, and an intermediate layer arranged between the first Heusler alloy layer and the second magnetic layer.

Embodiments will now be explained with reference to the accompanying drawings.

First Embodiment

Figure 1:
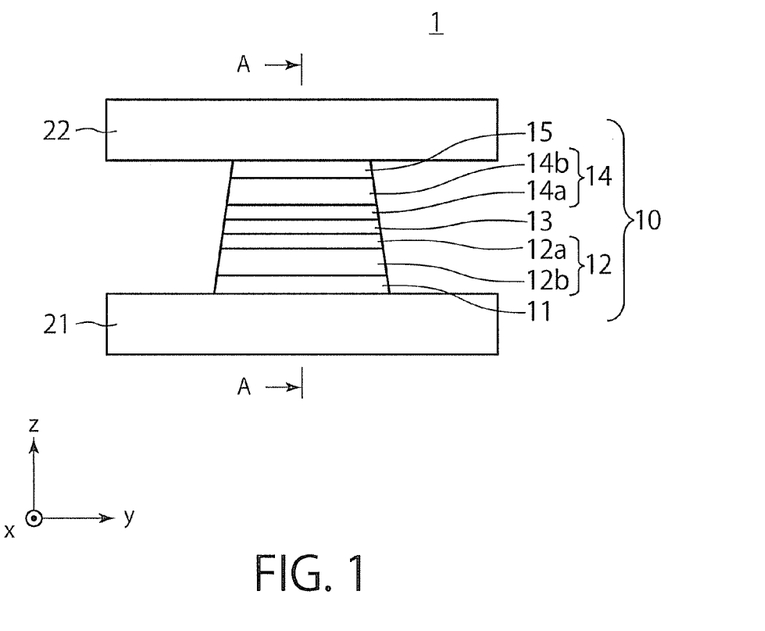
FIG. 1 is a plan view showing a reproduction unit of a magnetic head according to a first embodiment.
Figure 2:
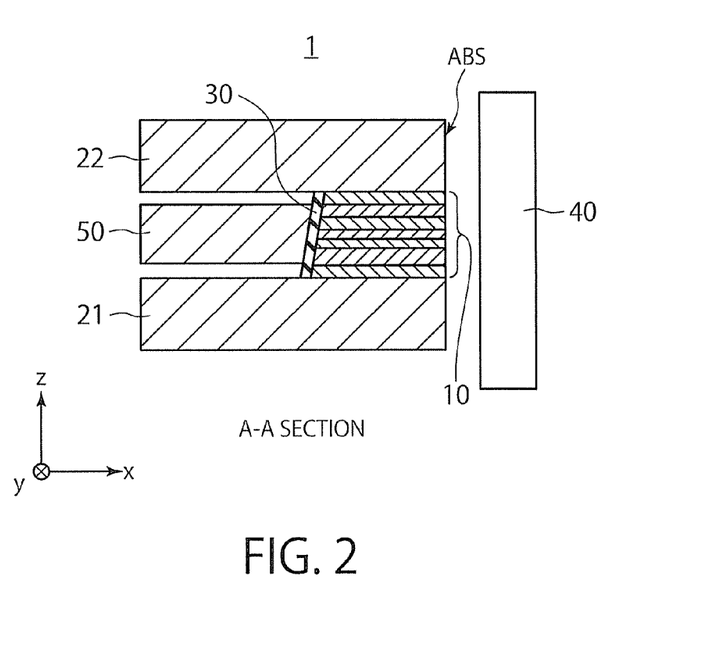
FIG. 2 is a cross-sectional view of the reproduction unit of the magnetic head according to the first embodiment.

A magnetic head according to a first embodiment includes a reproduction unit, which is shown in FIGS. 1 and 2. FIG. 1 is a plan view of the reproduction unit 1 viewed from the magnetic recording medium side, i.e., from a medium-facing surface (hereinafter also referred to as "air bearing surface (ABS)"), and FIG. 2 is a cross-sectional view of the reproduction unit 1 taken along line A-A in FIG. 1. In FIGS. 1 and 2, the x direction is a direction from the reproduction unit 1 to a magnetic recording medium 40, the y direction is a track-width direction of the magnetic recording medium 40, and the z direction is a tracking direction of the magnetic recording medium 40. The reproduction unit 1 includes a magnetoresistive film (hereinafter also referred to as the "MR film") 10 including a stacked film structure of magnetic materials having a magnetoresistance effect, and first and second magnetic shields 21, 22 arranged at both sides of the MR film 10. The MR film 10 has a base layer 11, a first magnetic layer 12, an intermediate layer 13, a second magnetic layer 14, and a cap layer 15. As shown in FIG. 1, the MR film 10 has a tapered shape narrowed from the magnetic shield 21 to the magnetic shield 22, i.e., along the track width direction. The tapered shape of the MR film 10 is formed by a regular process. However, the shape is not limited to the tapered shape, i.e., the widths of the layers can be uniform. As shown in FIG. 2, the heights of the layers of the MR film 10 from the ABS decrease in the direction from the magnetic shield 21 to the magnetic shield 22, i.e., along the track width direction.

In this embodiment, the first and the second magnetic layers 12, 14 each includes a stacked film structure having an iron (Fe) layer and a Heusler alloy layer. For example, the first magnetic layer 12 includes a Heusler alloy layer 12a between the base layer 11 and the intermediate layer 13, and an Fe layer 12b between the base layer 11 and the Heusler alloy layer 12a. The second magnetic layer 14 includes a Heusler alloy layer 14a between the intermediate layer 13 and the cap layer 15, and an Fe layer 14b between the Heusler alloy layer 14a and the cap layer 15. Thus, the Heusler alloy layers 12a, 14a are closer to the intermediate layer 13 than the Fe layers 12b, 14b.

A nonmagnetic metal layer of such a material as Ta, Ru, or Cu is used as the base layer 11. Alternatively, the base layer 11 can be formed by stacking multiple layers of such materials. A stacked film formed by sequentially stacking a Ta layer and a Cu layer is particularly preferable to obtain a high magnetoresistive (MR) ratio.

The intermediate layer 13 can be formed of a nonmagnetic metal layer of such a material as Cu or Ag, or an oxide layer of such a material as MgO, GaO, or ZnO. Alternatively, the intermediate layer 13 can have a structure in which a fine conductive region of a magnetic metal (such as Fe or Co) or nonmagnetic metal (such as Cu) is formed in an insulating layer.

A nonmagnetic metal layer of, for example, Ta, Ru, or Cu is used as the cap layer 15.

The Fe layer 12b and the Heusler alloy layer 12a are magnetically coupled with each other, and the magnetization direction thereof changes in response to a magnetic field from the magnetic recording medium 40. The first magnetic layer 12 is also called "free layer." The Fe layer 14b and the Heusler alloy layer 14a are also magnetically coupled with each other, and the magnetization direction thereof changes in response to a magnetic field from the magnetic recording medium 40. The second magnetic layer 14 is also called "free layer." A reproduction output is produced by the changes of the magnetization directions of the two free layers 12, 14 at both the sides of the intermediate layer 13 in response to the magnetic field of the magnetic recording medium 40.

An A-B-C alloy is used to form the Heusler alloy layers 12a, 14a, in which A is Co having a ratio of 40 at. % or more and 60 at. % or less, B is at least one element selected from the group consisting of Fe, Mn, Cr, and V having a ratio of 20 at. % or more and 30 at. % or less, and C is at least one element selected from the group consisting of Si, Al, Ge, Ga, Sn, and Sb having a ratio of 20 at. % or more and 30 at. % or less. Setting the ratio of the element in B-site to be from 20 at. % to 30 at. %, and the ratio of the element of C-site to be from 20 at. % to 30 at. % allows forming an ordered phase by a heat treatment at a temperature of about 300° C. Such a heat treatment can be performed in a process of manufacturing a magnetic head. Accordingly, a high MR ratio can be achieved. In particular, a CoFeMnSi alloy with Co being in A-site, Fe and Mn having a ratio of 6:4 being in B-site, and Si being in C-site is preferable since it has a low coercive force and a high MR ratio.

The Fe layers 12b, 14b can contain 10 at. % or less of an element other than Fe if such an element has a negative magnetostriction or a slight positive magnetostriction. If the ratio of the element other than Fe is 10 at. % or more, the magnetostriction increases by a few times the manetostriction in the case where there is no such element. Therefore, the Fe layers 12b, 14b preferably contain 90 at. % or more of Fe.

Side shield layers (for example, NiFe layers) can be arranged at both the sides of the track width of the MR film 10 to remove noise from the end portions of the track width although such layers are not shown in FIGS. 1 and 2. The magnetic shields 21, 22 can be formed of a NiFe alloy.

This embodiment further includes a hard bias film 50 arranged opposite to the air bearing surface of the MR film 10 with an insulating layer 30 of alumina or the like being interposed between the MR film 10 and the hard bias film 50, as shown in FIG. 2. The hard bias film 50 is adjacent to the MR film 10. By applying a bias magnetic field from the hard bias film 50 to the two magnetic layers 12, 14, the magnetic recording medium 40 linearly respond to the magnetic field, resulting in a strain-free reproduction output.

Example 1

Next, preferable thicknesses of the Heusler alloy layer 12a and the Fe layer 12b in the first magnetic layer 12 will be described. First, a plurality of samples of the reproduction unit according to the first embodiment is prepared. The materials and the thicknesses of the respective layers of the samples are as follows. The base layer 11 is a stacked film including a Ta layer having a thickness of 1 nm formed on the magnetic shield 21, and a Cu layer having a thickness of 2 nm formed on the Ta layer. The first magnetic layer 12 is a stacked film including the CoFeMnSi alloy layer 12a and the Fe layer 12b, the stacked film having a thickness of 6 nm. The intermediate layer 13 is a Cu layer having a thickness of 2 nm. The second magnetic layer 14 is a stacked film including the CoFeMnSi alloy layer 14a and the Fe layer 14b, the stacked film having a thickness of 6 nm. The cap layer 15 has a stacked film structure including a Cu layer having a thickness of 1 nm formed on the second magnetic layer 14 and a Ta layer having a thickness of 2 nm formed on the Cu layer. The thicknesses of the CoFeMnSi alloy layers 12a, 14a in the respective samples differ from each other, and eight samples having thicknesses of 1 nm, 1.5 nm, 2 nm, 3 nm, 4 nm, 4.5 nm, 5 nm, and 6 nm are prepared. As a result, the thicknesses of the Fe layers 12b, 14b in these samples become 5 nm, 4.5 nm, 4 nm, 3 nm, 1 nm, and 0 nm. The thicknesses of the CoFeMnSi alloy layers 12a, 14a in a single sample are the same. The crystal orientation of the Fe layers 12b, 14b in the first and second magnetic layers 12, 14 in the stacked film structure of the Fe layer and the Heusler alloy layer is (110). The crystal orientation of the Fe layers 12b, 14b is preferably (110) in order to obtain a low magnetostriction effect.

Figure 3:
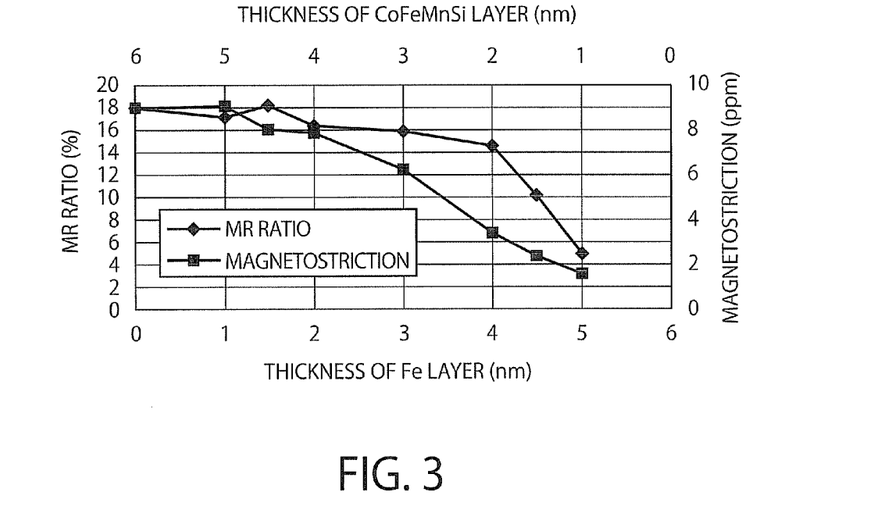
FIG. 3 is a diagram showing the dependence of the magnetoresistance (MR) ratio and the magnetostriction in a stacked film including an iron (Fe) layer and a Heusler alloy layer on the thicknesses of the Fe layer and the Heusler alloy layer.

The size of one side of each sample is approximately 0.1 μm. FIG. 3 shows a result of heating these samples at a temperature of 320° C. and studying the MR ratio and the magnetostriction of each sample.

As can be understood from FIG. 3, when the thickness of the Fe layers 12b, 14b exceeds 1.5 nm, the magnetostriction-reducing effect appears.

On the other hand, the MR ratio slightly decreases until the thickness of the CoFeMnSi alloy layer 12a decreases to 2 nm, but then rapidly decreases when the thickness becomes 1.5 nm or less. Thus, in order to obtain both a high MR ratio and a low magnetostriction, the thickness of the Fe layers 12b, 14b should to be 1.5 nm or more, and the thickness of the CoFeMnSi alloy layers 12a, 14a should be 2 nm or more. It is believed that the magnetostriction-reducing effect of Fe is obtained by the cancelling effect between the Fe layers 12b, 14b and the CoFeMnSi alloy layers 12a, 14a since the magnetostriction of a single Fe layer is negative or around zero, and the magnetostriction of the CoFeMnSi alloy layers 12a, 14a is around +10 ppm.

Comparative Example 1

Figure 4:
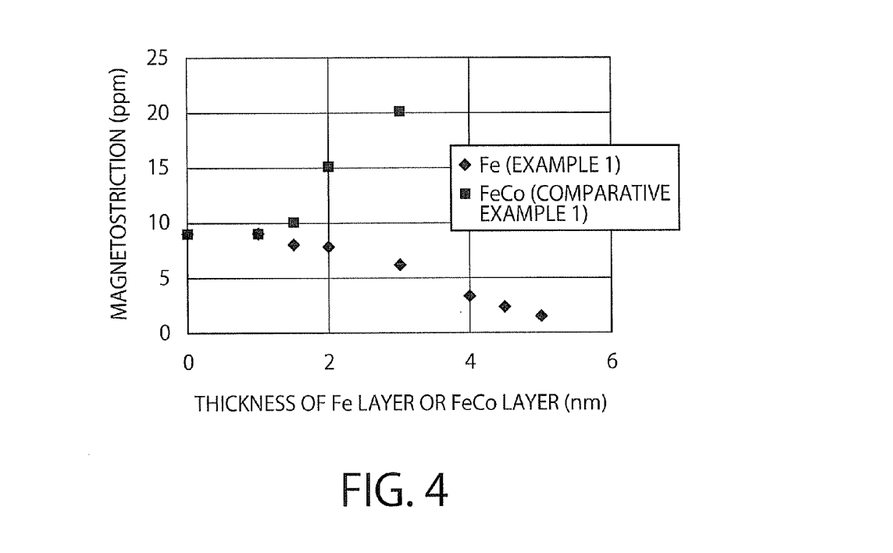
FIG. 4 is a diagram showing the dependence of the magnetostriction on the thicknesses of an Fe layer and a FeCo layer in Example 1 and Comparative Example 1.

A reproduction unit that uses $Fe_{50}Co_{50}$ alloy to form layers replacing the Fe layers 12b, 14b of the reproduction unit of Example 1 is prepared as Comparative Example 1. FIG. 4 shows the relationship between the magnetostriction and the thickness of the FeCo alloy in the reproduction unit of Comparative Example 1. The magnetostriction of the $Fe_{50}Co_{50}$ alloy is +30 ppm. FIG. 4 also shows the relationship between the magnetostriction and the thickness of the Fe layers 12b, 14b in Example 1. As can be understood from FIG. 4, an increase in the thickness of the FeCo alloy leads to an increase in the magnetostriction in the reproduction unit of Comparative Example 1. This result is opposite to the result of Example 1 using the Fe layers.

Comparative Example 2

Figure 5:
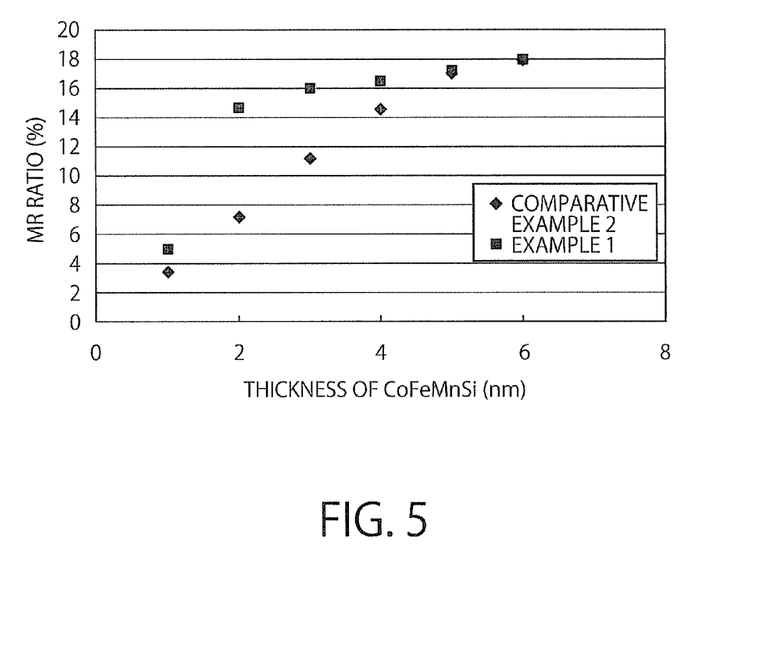
FIG. 5 is a diagram showing the dependence of the MR ratio on the thickness of a CoFeMnSi layer in Example 1 and Comparative Example 2.

A reproduction unit obtained by removing the Fe layers 12b, 14b from the reproduction unit of Example 1 to directly form the CoFeMnSi alloy layer 12a on the Cu layer, the base layer 11, and to directly form the cap layer 15 on the CoFeMnSi alloy layer 14a is prepared as Comparative Example 2. FIG. 5 shows the relationship between the MR ratio and the thickness of the CoFeMnSi alloy layers of the reproduction unit of Comparative Example 2. FIG. 5 also shows the relationship between the MR ratio and the thickness of the CoFeMnSi alloy layers 12b, 14b in Example 1 that includes the Fe layers 12b, 14b. As can be understood from FIG. 5, the MR ratio decreases linearly when the thickness of the CoFeMnSi alloy layers becomes 5 nm or less in the reproduction unit of Comparative Example 2.

In contrast, a high MR ratio can be obtained even if the CoFeMnSi alloy layers 12a, 14a are thin in Example 1 including the Fe layers 12b, 14b. In order to achieve a high MR ratio with a CoFeMnSi alloy, a good ordered crystal phase is needed. In Example 1 including the Fe layers 12b, 14b, the ordered crystal phase of the thin CoFeMnSi alloy layers 12a, 14a can be achieved easily by a heat treatment at a low temperature. As a result, a high MR ratio can be achieved.

Furthermore, in order to obtain a hard disk drive (HDD) with a high-recording density of 1.5 Tb/in$^2$, a high-resolution reproduction of fine bits is required. In order to achieve this, the distance between the magnetic shield 21 and the magnetic shield 22 should be narrowed to about 20 nm or less. As shown in FIG. 3, if the thickness of the base layer 11 is 3 nm, the thickness of the intermediate layer 13 is 2 nm, the thickness of the cap layer 15 is 3 nm, and the thickness of the upper and lower free layers 12, 14 is in the range of 4 nm to 6 nm, the distance between the magnetic shields 21, 22 can be in the range of 16 nm to 20 nm.

If the thickness of the intermediate layer 13 is decreased to 1 nm, the cap layer 15 to 2 nm, and the base layer 11 to 2 nm, the distance between the magnetic shields 21, 22 is 21 nm when the thickness of the free layers 12, 14 is 8 nm. In this case, a reproduction resolution of about 1.5 Tbp/in$^2$ can be achieved. The smallest thickness of each of the high-sensitivity and low-noise free layers 12, 14 is 3.5 nm, which is the sum of the thickness of the Fe layer 12b or 14b, 1.5 nm, and the thickness of the CoFeMnSi layer 12a or 14a, 2 nm.

Example 2

Figure 6:
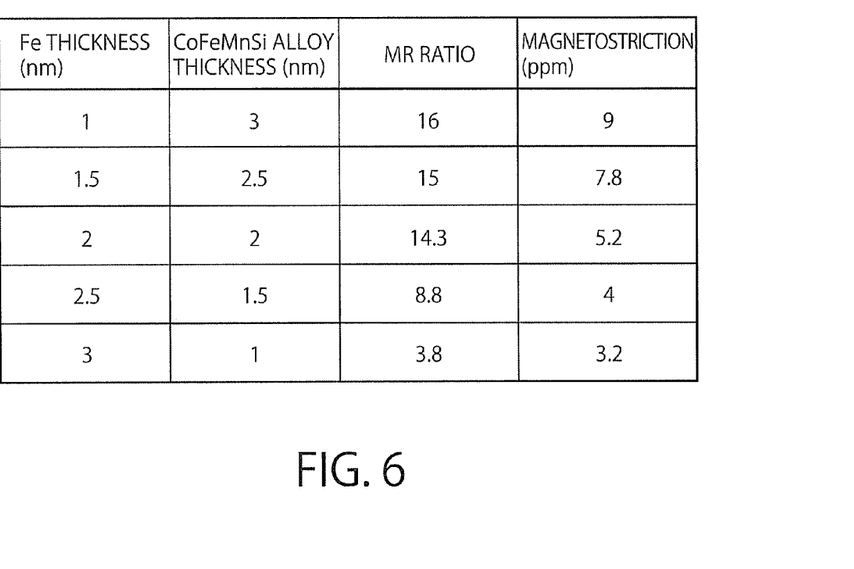
FIG. 6 is a diagram showing the relationship, in a reproduction unit including a stacked film having an Fe layer and a Heusler alloy layer, between the MR ratio and the magnetostriction, and the thicknesses of the Fe layer and the Heusler alloy layer.

FIG. 6 shows the magnetostriction and the MR ratio of Example 2 including free layers 12, 14 each having a thickness of 4 nm. The materials and the thicknesses of the intermediate layer 13, the base layer 11, and the cap layer 15 are the same as those of the case shown in FIG. 3. As can be understood from FIG. 6, the thickness of the CoFeMnSi layers 12a, 14a should be 2 nm or more in order to achieve a high MR ratio, and the thickness of the Fe layers 12b, 14b should be 1.5 nm or more in order to decrease the magnetostriction.

As has been described, the magnetostriction and the noise can be reduced in the first embodiment by setting the thickness of the Fe layers 12b, 14b of the first and the second magnetic layers 12, 14 to be 1.5 nm or more.

Furthermore, a high MR ratio can be obtained by setting the thickness of the Heusler alloy layers 12a, 14a of the first and the second magnetic layers 12, 14 to be 2 nm or more.

Moreover, fine recording bits can be reproduced with a high resolution by setting the thickness of each of the first and the second magnetic layers 12, 14 to be in the range of 3.5 nm or more and 8 nm or less.

Thus, according to the first embodiment, a magnetoresistive magnetic head with a high resolution and suppressed noise characteristics can be provided.

Although the first magnetic layer 12 is formed on the base layer 11, the intermediate layer 13 is formed on the first magnetic layer 12, and the second magnetic layer 14 is formed on the intermediate layer 13 in the first embodiment, the second magnetic layer 14 can be formed on the base layer 11, the intermediate layer 13 can be formed on the second magnetic layer 14, and the first magnetic layer 12 can be formed on the intermediate layer 13.

Second Embodiment

Figure 7:
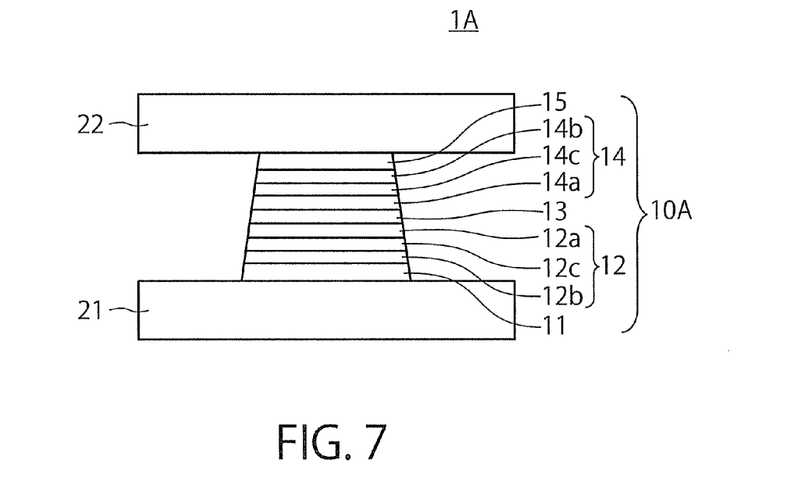
FIG. 7 is a plan view showing a reproduction unit of a magnetic head according to the second embodiment.

A magnetic head according to a second embodiment will be described with reference to FIG. 7. The magnetic head of the second embodiment includes a reproduction unit 1A shown in FIG. 7, which is obtained by replacing the MR film 10 with an MR film 10A in the reproduction unit 1 of the first embodiment shown in FIGS. 1 and 2. The MR film 10A is obtained by inserting a Cu layer 12c between the Fe layer 12b and the Heusler alloy layer (CoFeMnSi alloy layer) 12a in the first magnetic layer 12 and inserting a Cu layer 14c between the Heusler alloy layer (CoFeMnSi alloy layer) 14a and the Fe layer 14b of the second magnetic layer 14 in the MR film 10. Incidentally, Ru layers can be used instead of the Cu layers 12c and 14c to have the same effect.

Figure 8:
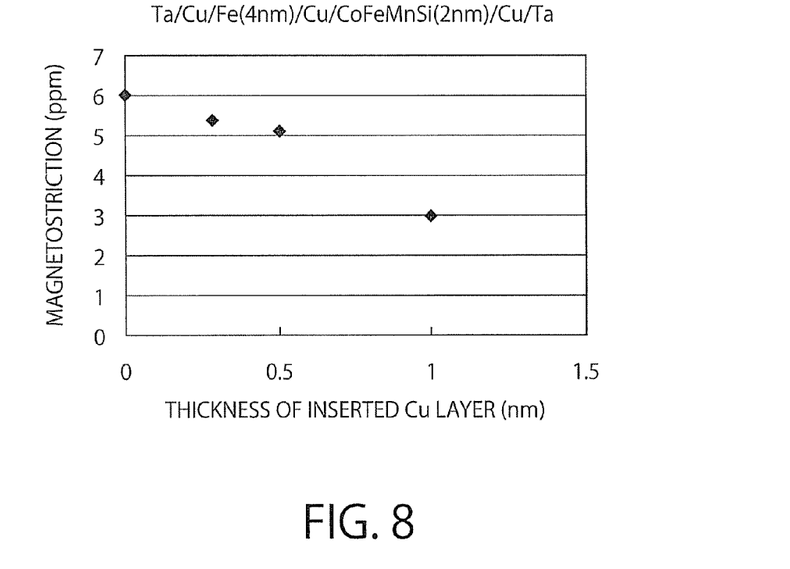
FIG. 8 is a diagram showing the dependence of the magnetostriction on the thickness of a Cu layer inserted between an Fe layer and a Heusler alloy layer.

Next, the dependence of the magnetostriction on the thickness of Cu layer in the case where a Cu layer is inserted between an Fe layer and a CoFeMnSi alloy layer as in the reproduction unit 1A of the second embodiment will be described with reference to FIG. 8.

First, four samples are prepared, each including a Ta layer, a Cu layer, an Fe layer (4 nm), a Cu layer, a CoFeMnSi alloy layer (2 nm), a Cu layer, and a Ta layer stacked in this order. The thickness of the Cu layer between the Fe layer (4 nm) and the CoFeMnSi alloy layer (2 nm) differs in each of the four samples. The thicknesses of the Cu layers in the samples are 0 nm, 0.3 nm, 0.5 nm, and 1 nm. FIG. 8 shows the magnetostrictions of the respective samples. As can be understood from FIG. 8, the magnetostriction decreases when a Cu layer is inserted between a Fe layer and a CoFeMnSi alloy layer.

The MR characteristics are studied of the reproduction unit 1A in the second embodiment, including the MR film 10A obtained by inserting the Cu layer with a thickness of 1 nm between the Fe layer 12b and the CoFeMnSi alloy layer 12a and inserting the Cu layer with a thickness of 1 nm between the Fe layer 14b and the CoFeMnSi alloy layer 14a. As a result, an MR ratio close to that of the reproduction unit of the first embodiment including no Cu layer is obtained. If the thickness of the Cu layer inserted is increased to 2 nm, the magnetic coupling between the Fe layer and the CoFeMnSi alloy layer considerably decreases. This makes it difficult for the Fe layer and the CoFeMnSi alloy layer constituting the free layer to respond to the magnetic field from the magnetic recording medium with a constant magnetization state being maintained. As a result, the operation of the apparatus becomes unstable. Thus, the thickness of the Cu layer to be inserted is preferably 0.3 nm or more and 1 nm or less. If a Cu layer with a thickness in this range is inserted between the Fe layer and the CoFeMnSi alloy layer, the magnetostriction becomes lower than that of the magnetic head of the first embodiment, and a stable operation can be performed.

As in the case of the first embodiment, a magnetoresistive magnetic head with a high sensitivity and low noise characteristics can be provided according to the second embodiment.

Although the first magnetic layer 12 is formed on the base layer 11, an intermediate layer 13 is formed on the first magnetic layer 12, and the second magnetic layer 14 is formed on the intermediate layer 13 in the second embodiment, the second magnetic layer 14 can be formed on the base layer 11, the intermediate layer 13 can be formed on the second magnetic layer 14, and the first magnetic layer 12 can be formed on the intermediate layer 13.

Third Embodiment

Figure 9:
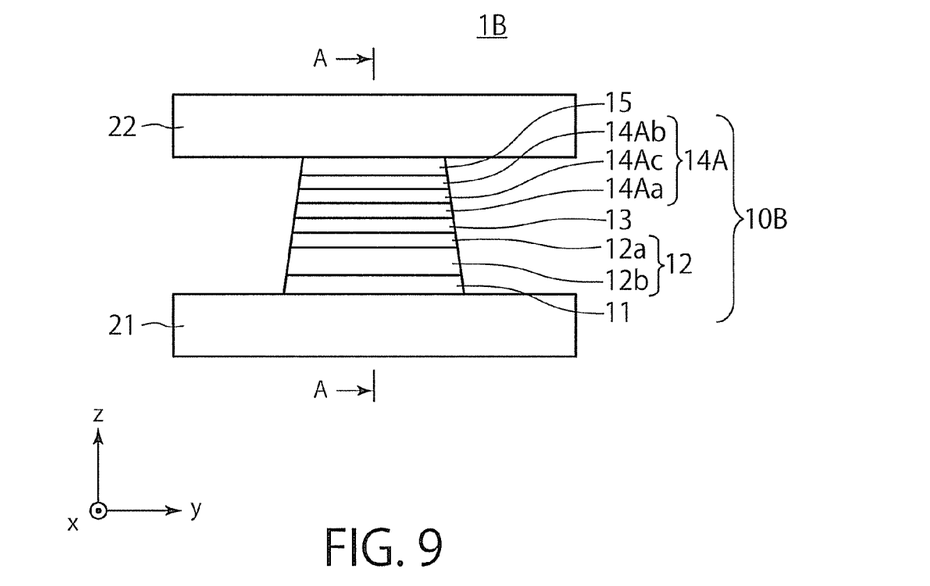
FIG. 9 is a plan view of a reproduction unit of a magnetic head according to the third embodiment.
Figure 10:
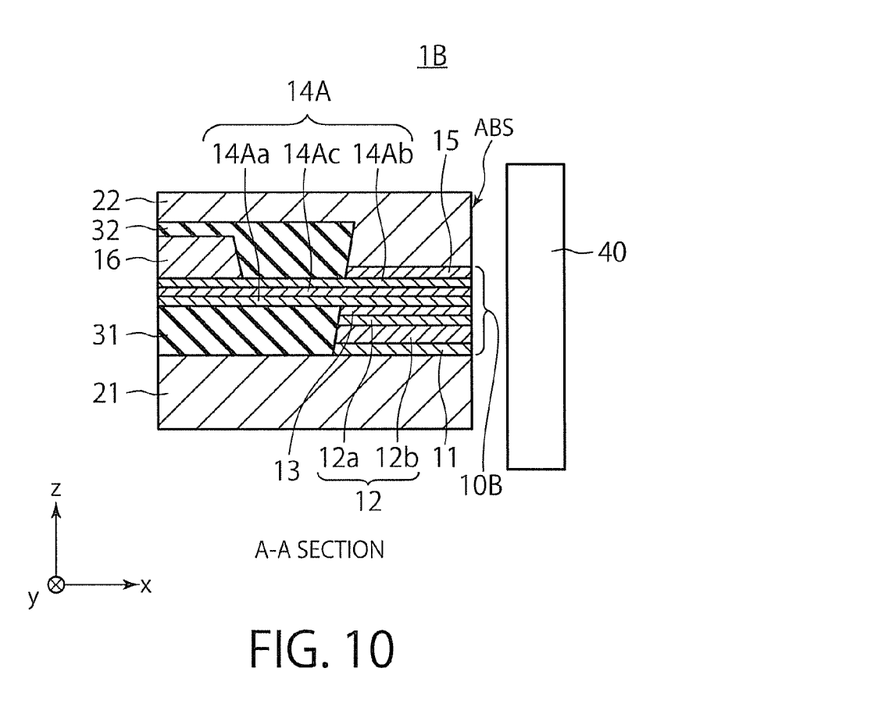
FIG. 10 is a cross-sectional view of the reproduction unit of the magnetic head according to the third embodiment.

A magnetic head according to a third embodiment includes a reproduction unit shown in FIGS. 9 and 10. FIG. 9 is a plan view of the reproduction unit 1B viewed from the magnetic recording medium side, i.e., the air bearing surface (ABS), and FIG. 10 is a cross-sectional view of the reproduction unit 1B taken along line A-A in FIG. 9. In FIGS. 9 and 10, the x direction is a direction from the reproduction unit 1B to a magnetic recording medium 40, the y direction is a track-width direction of the magnetic recording medium 40, and the z direction is a tracking direction of the magnetic recording medium 40.

The reproduction unit 1B is obtained by replacing the MR film 10 of the reproduction unit 1 shown in FIGS. 1 and 2 with an MR film 10B, and newly including an antiferromagnetic layer 16. The MR film 10B is obtained by replacing the second magnetic layer 14 of the MR film 10 with a second magnetic layer 14A. The second magnetic layer 14A has a stacked film structure including a magnetic layer 14Aa having a thickness of 2 nm and formed of, for example, a CoFe alloy or Heusler alloy described in the descriptions of the first embodiment, an intermediate layer 14Ac having a thickness of 0.8 nm to 1 nm and formed of, for example, Ru, and a magnetic layer 14Ab having a thickness of 2 nm and formed of, for example, a CoFe alloy. The magnetic layer 14Aa is arranged closer to the intermediate layer 13 than the magnetic layer 14Ab. The magnetic layer 14Aa and the magnetic layer 14Ab are coupled by anti-ferromagnetic coupling via the intermediate layer 14Ac to fix the magnetization. As shown in FIG. 10, the second magnetic layer 14A extends toward the side opposite to the ABS side. The extending part of the second magnetic layer 14A is isolated from the magnetic shields 21, 22 by insulating layers 31, 32. Specifically, the insulating layer 31 is interposed between the magnetic layer 14Aa of the extending part of the second magnetic layer 14A and the magnetic shield 21, and the insulating layer 32 is interposed between the magnetic layer 14Ab of the extending part of the second magnetic layer 14A and the magnetic shield 22. The antiferromagnetic layer 16 of, for example, IrMn having a thickness of 5 nm to 8 nm is formed between the magnetic layer 14Ab of the extending part of the second magnetic layer 14A and the insulating layer 32. The antiferromagnetic layer 16 fixes the magnetization of the magnetic layer 14Ab to one direction. Thus, the magnetization of the second magnetic layer 14 can be strongly fixed by the antiferromagnetic layer 16. Furthermore, as shown in FIG. 10, the antiferromagnetic layer 16 is located with a distance from the ABS. As a result, the distance between the magnetic shields 21, 22 can be set to be about 20 nm, which is narrower than that of a case where the antiferromagnetic layer 16 is interposed between the magnetic layer 14Ab and the cap layer 15.

As in the case of the first embodiment, the third embodiment can reduce the magnetostriction and noise by setting the thickness of the Fe layer 12b of the first magnetic layer 12 to be 1.5 nm or more.

Furthermore, the third embodiment can obtain a high MR ratio by setting the thickness of the Heusler alloy layer 12a of the first magnetic layer 12 to be 2 nm or more.

If the thickness of the first magnetic layer 12 is set to be 3.5 nm or more and 8 nm or less, fine recording bits can be reproduced with a high resolution.

Thus, according to the third embodiment, a magnetoresistive magnetic head with a high resolution and suppressed noise characteristics can be provided.

Although the first magnetic layer 12 is formed on the base layer 11, the intermediate layer 13 is formed on the first magnetic layer 12, and the second magnetic layer 14A is formed on the intermediate layer 13 in the third embodiment, the second magnetic layer 14A can be formed on the base layer 11, the intermediate layer 13 can be formed on the second magnetic layer 14A, and the first magnetic layer 12 can be formed on the intermediate layer 13. Also in this case, the antiferromagnetic layer 16 should be formed on the second magnetic layer 14A.

Fourth Embodiment

A magnetic recording and reproducing apparatus according to a fourth embodiment will be described below.

Any of the magnetic heads of the first to the third embodiments described above can be incorporated into, for example, a recording and reproducing magnetic head assembly to be mounted in a magnetic recording and reproducing apparatus. The magnetic recording and reproducing apparatus according to the fourth embodiment may have a reproduction function, or both the recording function and the reproduction function.

Figure 11:
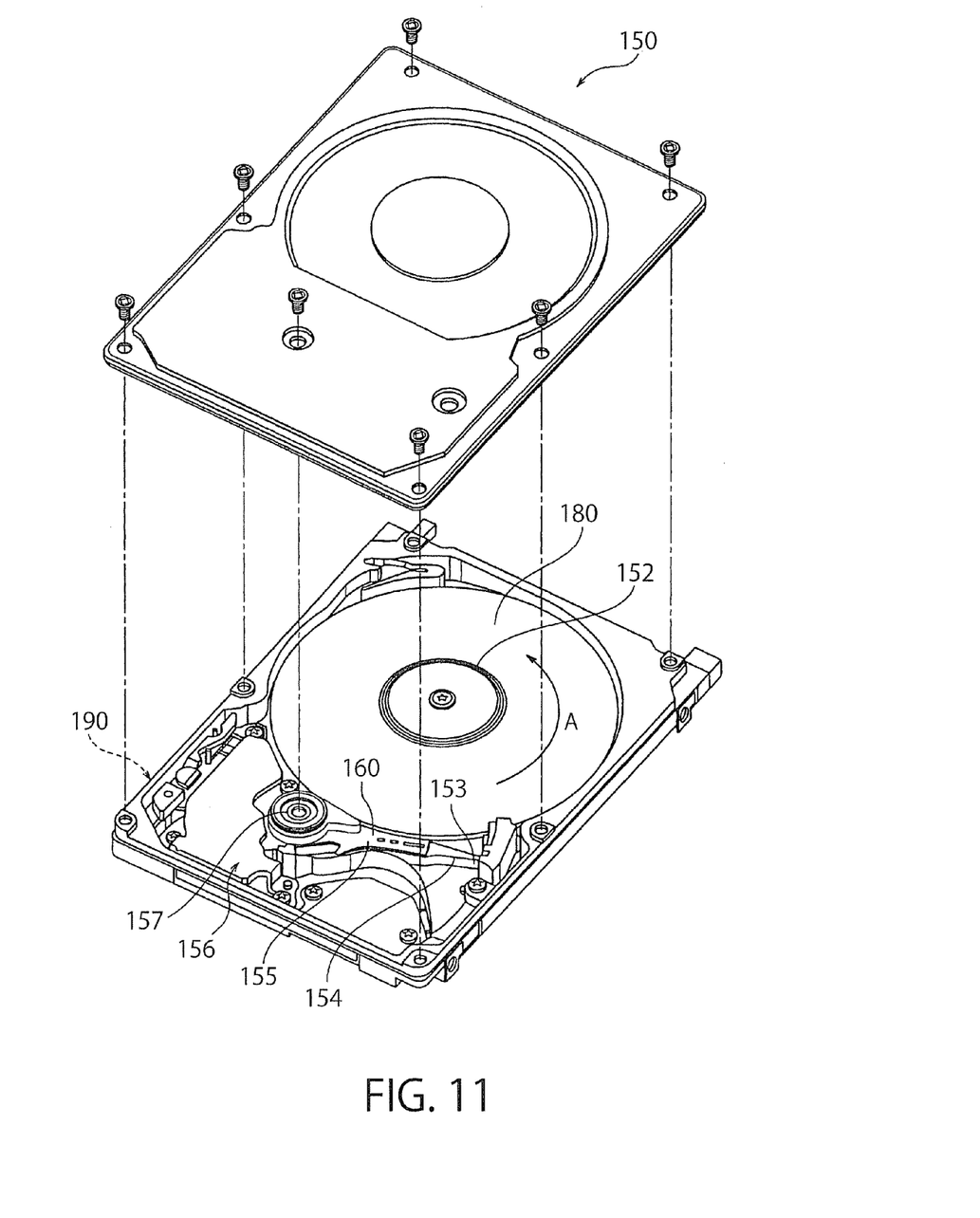
FIG. 11 is a schematic perspective view of a magnetic recording and reproducing apparatus according to the fourth embodiment.

FIG. 11 is a schematic perspective view showing an example of the structure of the magnetic recording and reproducing apparatus according to the fourth embodiment. As shown in FIG. 11, the magnetic recording and reproducing apparatus 150 of the fourth embodiment has a rotary actuator. In FIG. 11, a recording medium disk 180 is mounted to a spindle motor 152, and rotated in the direction of the arrow A by a motor (not shown) that responds to a control signal from a drive device controller (not shown). The magnetic recording and reproducing apparatus 150 of the fourth embodiment can have a plurality of recording medium disks 180.

A head slider 153 for recording and reproducing data stored in the recording medium disk 180 is attached to an end of a suspension 154 that is in a thin-film form. The head slider 153 has, at around an end thereof, one of the magnetic heads according to the embodiments described above with the magnetic shields.

When the recording medium disk 180 is rotated, the air bearing surface (ABS) of the head slider 153 is lifted and held above the recording medium disk 180 with a certain floating distance from the surface of the recording medium disk 180. The head slider 153 can be of so-called "contact tracking type" that contacts the recording and reproducing medium disk 180.

The suspension 154 is connected to an end of an actuator arm 155 including such parts as a bobbin part for supporting a drive coil (not shown). The other end of the actuator arm 155 is connected to a voice coil motor 156, which is a kind of linear motor. The voice coil motor 156 can include a drive coil (not shown) wound around the bobbin part of the actuator arm 155, and a magnetic circuit including a permanent magnet and a facing yoke that are arranged at both the sides of the coil.

The actuator arm 155 is supported by ball bearings (not shown) arranged at upper and lower portions of a bearing unit 157, and can be rotated and slid feely by means of the voice coil motor 156.

Figure 12:
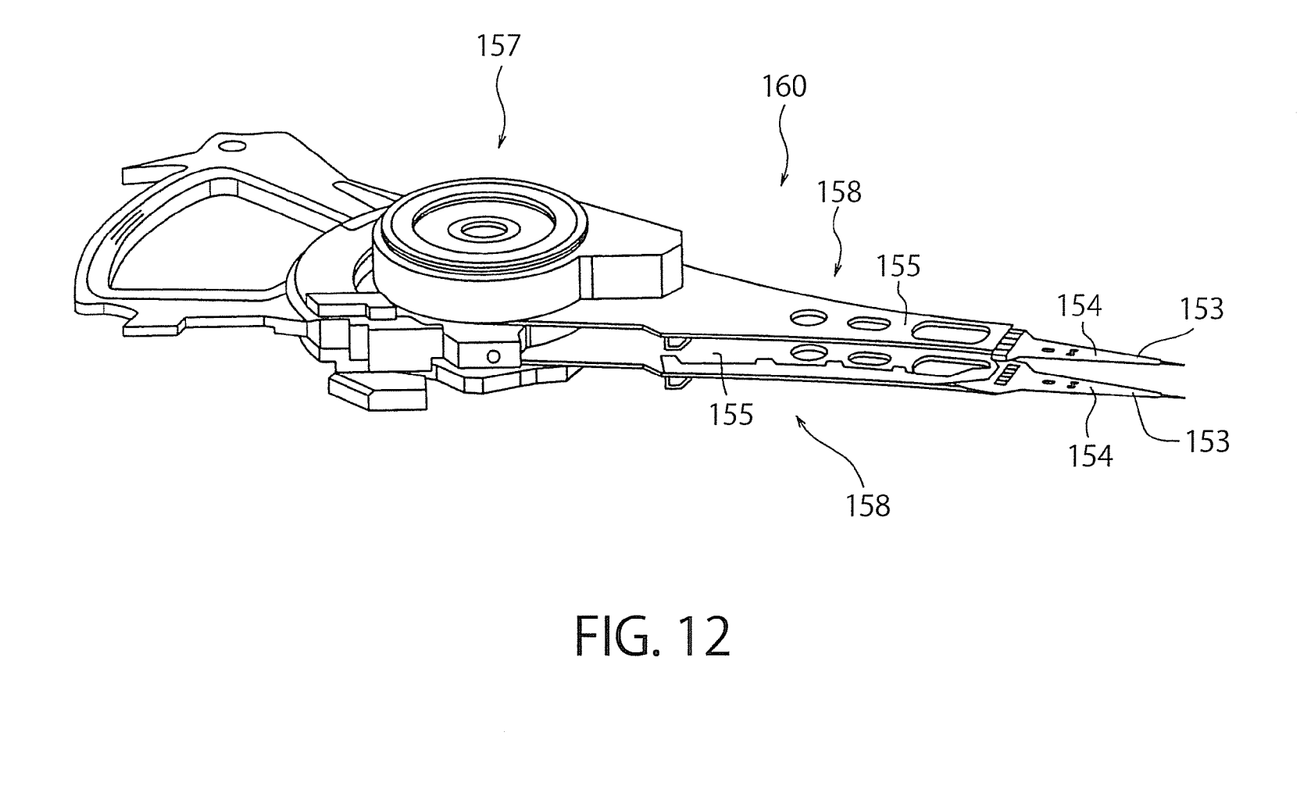
FIG. 12 is a perspective view showing a head stack assembly on which a head slider is mounted.

FIG. 12 shows an example of the structure of a part of the magnetic recording and reproducing apparatus according to the fourth embodiment, and is an enlarged perspective view of an magnetic head assembly 160 from the actuator arm 155 to the end, viewed from the disk side. As shown in FIG. 12, the magnetic head assembly 160 includes the bearing unit 157, a head gimbal assembly (hereinafter referred to as the "HGA") 158 extending from the bearing unit 157, and a support frame that supports the coil of the voice coil motor, extending from the bearing unit 157 to the direction opposite to the direction of the HGA. The HGA includes the actuator arm 155 extending from the bearing unit 157, and the suspension 154 extending from the actuator arm 155.

The head slider 153 including the magnetic head according to any of the first to the third embodiments is attached to the tip of the suspension 154.

Thus, the magnetic head assembly 160 according to the fourth embodiment includes the magnetic head according to any of the first to the third embodiments, the suspension 154 for holding the magnetic head at one end thereof, and the actuator arm 155 attached to the other end of the suspension 154.

The suspension 154 includes lead lines (not shown) for writing and reading signals, which is electrically connected to respective electrodes of the magnetic recording head attached to the head slider 153. The magnetic head assembly 160 also includes an electrode pad that is not shown.

The magnetic head assembly 160 further includes a signal processing unit 190 (not shown) for writing signals to and reading signals from a magnetic recording medium using the magnetic recording head. The signal processing unit 190 is, for example, attached to the back side of the magnetic recording and reproducing apparatus 150 shown in FIG. 11. Input and output lines of the signal processing unit 190 are connected to the electrode pad, and electrically coupled with the magnetic recording head.

Thus, the magnetic recording and reproducing apparatus 150 according to the fourth embodiment includes a magnetic recording medium, a magnetic head according to any of the first to the third embodiments, a movable unit (movement controller) for keeping positions of the magnetic recording medium and the magnetic head to face each other in a separating or contacting state, and causing them to move relative to each other, a position controller for adjusting the position of the magnetic head to a predetermined recording position on the magnetic recording medium, and a signal processing unit for writing signals to and reading signals from the magnetic recording medium by means of the magnetic head. The recording medium disk 180 is used as the aforementioned magnetic recording medium. The aforementioned movable unit may include the head slider 153. Furthermore, the aforementioned position controller may include the magnetic head assembly 160.

When the magnetic disk 180 is rotated, and the voice coil motor 156 is caused to rotate the actuator arm 155 to load the head slider 153 above the magnetic disk 180, the air bearing surface (ABS) of the head slider 153 attached to the magnetic head is supported above the surface of the magnetic disk 180 with a predetermined distance from the surface of the magnetic disk 180. In this manner, the data stored in the magnetic disk 180 can be read based on the aforementioned principle.

As described above, according to the fourth embodiment, a magnetic recording and reproducing apparatus including a magnetoresistive magnetic head with a high sensitivity and suppressed noise characteristics can be provided.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A magnetic head comprising:
   a first magnetic shield and a second magnetic shield that are opposed to each other; and
   a magnetoresistive film arranged between the first magnetic shield and the second magnetic shield, and comprising a first magnetic layer including a first metal layer that contains 90 at. % or more of Fe and a first Heusler alloy layer, a second magnetic layer arranged on a side of the first Heusler alloy layer opposite from the first magnetic layer, and an intermediate layer arranged between the first Heusler alloy layer and the second magnetic layer, the first magnetic layer having a thickness of 3.5 nm or more and 8 nm or less.

2. The head according to claim 1, wherein the first metal layer has a thickness of 1.5 nm or more, and the first Heusler alloy layer has a thickness of 2 nm or more.

3. The head according to claim 1, wherein:
   the first Heusler alloy layer contains an A-B-C alloy, in which A is Co at a ratio of 40 at. % or more and 60 at. % or less, B is at least one element selected from the group consisting of Fe, Mn, Cr, and V at a ratio of 20 at. % or more and 30 at. % or less, and C is at least one element selected from the group consisting of Si, Al, Ge, Ga, Sn, and Sb at a ratio of 20 at. % or more and 30 at. % or less.

4. The head according to claim 1, wherein the first magnetic layer has a magnetization, a direction of which varies in response to an external magnetic field.

5. The head according to claim 1, wherein the first magnetic layer includes one of a first Cu layer and a first Ru layer between the first metal layer and the first Heusler alloy layer.

6. The head according to claim 1, wherein the second magnetic layer includes a second Heusler alloy layer formed on the intermediate layer, and a second Fe layer formed on the second Heusler alloy layer.

7. The head according to claim 1, further comprising a hard bias film arranged between the first magnetic shield and the second magnetic shield so as to be distant from the magnetoresistive film.

8. The head according to claim 1, further comprising an antiferromagnetic layer between the first magnetic shield and the second magnetic shield for fixing a magnetization of the second magnetic layer, wherein:
   the second magnetic layer has an extending portion that extends so as to be longer than the first magnetic layer and the intermediate layer in a direction perpendicular to a direction from the first magnetic shield to the second magnetic shield; and
   the antiferromagnetic layer is arranged near the extending portion of the second magnetic layer.

9. The head according to claim 1, wherein a base layer is formed between the first magnetic shield and the magnetoresistive film.

10. The head according to claim 1, wherein the second magnetic layer has a magnetization, a direction of which varies in response to an external magnetic field.

11. The head according to claim 1, wherein a direction of magnetization of the second magnetic layer is fixed.

12. The device according to claim 1, wherein each of the first magnetic layer, the intermediate layer, the second magnetic layer, the first magnetic shield, and the second magnetic shield has an side face parallel to a direction from the first magnetic shield to the second magnetic shield, the side faces being positioned in the same plane.

13. A magnetic recording and reproducing apparatus comprising:
- a magnetic recording medium;
- a magnetic head comprising
  - a first magnetic shield and a second magnetic shield that are opposed to each other; and
  - a magnetoresistive film arranged between the first magnetic shield and the second magnetic shield, and comprising a first magnetic layer including a first metal layer that contains 90 at. % or more of Fe and a first Heusler alloy layer, a second magnetic layer arranged on a side of the first Heusler alloy layer opposite from the first magnetic layer, and an intermediate layer arranged between the first Heusler alloy layer and the second magnetic layer, the first magnetic layer having a thickness of 3.5 nm or more and 8 nm or less;
- a movement controller that controls movements of the magnetic recording medium and the magnetic head so that they face each other and move relative to each other in a floating or contacting state;
- a position controller that controls a position of the magnetic head to be at a predetermined recording position of the magnetic recording medium; and
- a signal processing unit that processes a write signal to the magnetic recording medium and a read signal from the magnetic recording medium using the magnetic head.

14. The apparatus according to claim 13, wherein the first metal layer has a thickness of 1.5 nm or more, and the first Heusler alloy layer has a thickness of 2 nm or more.

15. The apparatus according to claim 13, wherein:
- the first Heusler alloy layer contains an A-B-C alloy, in which A is Co at a ratio of 40 at. % or more and 60 at. % or less, B is at least one element selected from the group consisting of Fe, Mn, Cr, and V at a ratio of 20 at. % or more and 30 at. % or less, and C is at least one element selected from the group consisting of Si, Al, Ge, Ga, Sn, and Sb at a ratio of 20 at. % or more and 30 at. % or less.

16. The apparatus according to claim 13, wherein the first magnetic layer has a magnetization, a direction of which varies in response to an external magnetic field.

17. The apparatus according to claim 13, wherein the first magnetic layer includes one of a first Cu layer and a first Ru layer between the first metal layer and the first Heusler alloy layer.

18. The apparatus according to claim 13, wherein the second magnetic layer includes a second Heusler alloy layer formed on the intermediate layer, and a second Fe layer formed on the second Heusler alloy layer.

19. The apparatus according to claim 13, further comprising a hard bias film arranged between the first magnetic shield and the second magnetic shield so as to be distant from the magnetoresistive film.

20. The apparatus according to claim 13, further comprising an antiferromagnetic layer between the first magnetic shield and the second magnetic shield for fixing a magnetization of the second magnetic layer, wherein:
- the second magnetic layer has an extending portion that extends so as to be longer than the first magnetic layer and the intermediate layer in a direction perpendicular to a direction from the first magnetic shield to the second magnetic shield; and
- the antiferromagnetic layer is arranged near the extending portion of the second magnetic layer.

21. The apparatus according to claim 13, wherein a base layer is formed between the first magnetic shield and the magnetoresistive film.

22. The apparatus according to claim 13, wherein the second magnetic layer has a magnetization, a direction of which varies in response to an external magnetic field.

23. The apparatus according to claim 13, wherein a direction of magnetization of the second magnetic layer is fixed.

24. The apparatus according to claim 13, wherein each of the first magnetic layer, the intermediate layer, the second magnetic layer, the first magnetic shield, and the second magnetic shield has an side face parallel to a direction from the first magnetic shield to the second magnetic shield, the side faces being positioned in the same plane.

* * * * *